Patented Nov. 8, 1932

1,887,156

UNITED STATES PATENT OFFICE

ERIC T. HESSLE, OF LOCKPORT, ILLINOIS, ASSIGNOR TO MID-WEST CHEMICAL COMPANY, OF CHICAGO, ILLINOIS, A CORPORATION OF ILLINOIS

INSECTICIDE AND PROCESS OF MAKING THE SAME

No Drawing.  Application filed May 8, 1929.  Serial No. 361,548.

This invention relates to an insecticide and to a process of making the same.

Mineral oils containing dissolved or suspended sulphur have heretofore been experimented with for insecticidal purposes, but, dissolved or suspended sulphur has been found to be injurious to plant life.

It is an object of this invention to provide a process for preparing a combined insecticide and fungicide containing sulphur in combined form with organic compounds and suitable for use both as a summer and winter spray without detrimental effect upon the plant.

Other and further important objects of this invention will become apparent from the following description and appended claims.

In my copending application Serial No. 361,547 entitled Insecticide, executed of even date herewith, I have described a process of preparing cyclic hydrocarbon compounds having sulphur in the ring, these compounds being of a generally thiophenic nature. I have now found that if compounds of this nature be combined with hydrocarbon sulphides, very valuable results are obtained from the use of such a mixture as an insecticide and fungicide.

The cyclic hydrocarbon-sulphur compounds, obtained after vacuum distillation according to the process described in my copending application, contain combined organic sulphur in the ring structure. Such compounds, or oils largely comprising cyclic hydrocarbon-sulphur compounds, form the starting material for my present process.

The starting material is heated to between 200° and 250° C. in the presence of from five to ten per cent by weight of molecular sulphur, added in the form of flowers of sulphur, or the like. The heating is suitably effected indirectly by means of an oil jacket or the like, since if direct flame is used, carbonization of the oil and polymerized products are likely to result. Preferably, a jacketed, closed tank provided with an agitator and having a protective lining is used. The heating is continued for approximately two hours, during which time some hydrogen-sulphide gas is evolved.

At the end of the heating period, the reaction mass is agitated to prevent premature settling out of excess sulphur and some polymerization products and to complete the reaction. The mass is then cooled to a relatively low temperature to cause the excess sulphur held in solution in the oil while hot to crystallize out. It is necessary to "freeze" the molecular sulphur out of solution, since its presence in the final product is detrimental to the use of the product as a summer spray. After all of the sulphur has crystallized out, the liquid portion of the mass is removed, preferably by decanting and filtering.

The liquid mixture thus obtained, constituting my insecticide base and composed of cyclic hydrocarbon-sulphur compounds and hydrocarbon sulphides, free from dissolved or suspended molecular sulphur, contains between two and three times as much combined sulphur content as the starting material. Such a mixture possesses excellent insecticidal and fungicidal properties. For use as a spray, the liquid mixture may be emulsified by the use of any suitable emulsifier, such as a saponified sulphonated fish oil or other fatty acid water insoluble soaps, casein or its salts, phenol, dextrin, soluble starch, gelatine and many other emulsifying agents, and a water and oil emulsion formed containing not more than five and preferably about two per cent of the mixture of cyclic hydrocarbon-sulphur compounds and hydrocarbon sulphides.

Preferably, in forming an emulsion for spraying, an organic emulsifier is used, such as a colloidal mixture of hydrocarbon sulphones and sulphonic acids, or either of these compounds, the preparation of which is disclosed in my copending application entitled "Synthetic tanning materials and a process of making the same", Serial No. 282,044, filed May 31, 1928. While, in general, the proportion of my insecticide base and of organic emulsifier may be varied considerably, preferably about 25% of emulsifier and 75% of the insecticide base containing cyclic hydrocarbon-sulphur compounds and hydrocarbon sulphides is employed.

It will, of course, be understood that the sulphonic acids in the organic emulsifier may be neutralized or partially neutralized, or may be in the free acid state. There should, however, be no free mineral acid present.

Inasmuch as the composition containing hydrocarbon sulphones and sulphonic acids acts not alone as an emulsifier to form stable emulsions but also as an insecticide, its combination with the mineral oil containing hydrocarbons having sulphur in the ring and hydrocarbon sulphides is particularly efficacious for the purposes set forth.

I am aware that numerous details of the process may be varied through a wide range without departing from the principles of this invention, and I, therefore, do not purpose limiting the patent granted hereon otherwise than necessitated by the prior art.

I claim as my invention:

1. The process of preparing an oil mixture containing cyclic hydrocarbons having sulphur in the ring and open chain hydrocarbon sulphides, which comprises adding molecular sulphur to oil containing cyclic hydrocarbon-sulphur compounds, heating the mixture to a temperature of from 200 to 250 degrees C., cooling to crystallize out the dissolved sulphur and recovering the liquid mixture substantially free from molecular sulphur.

2. The process of preparing an oil mixture containing cyclic hydrocarbons having sulphur in the ring and open chain hydrocarbon sulphides, which comprises adding molecular sulphur to oil containing cyclic hydrocarbon-sulphur compounds, heating the mixture to 200° to 250° C. with indirect heat, cooling to crystallize out the dissolved sulphur and recovering the liquid mixture substantially free from molecular sulphur.

3. The process of preparing an oil mixture containing cyclic hydrocarbons having sulphur in the ring and open chain hydrocarbon sulphides, which comprises adding from 5% to 10% of molecular sulphur to oil containing cyclic hydrocarbon-sulphur compounds, heating the mixture to 200° to 250° C. with indirect heat, cooling to crystallize out the dissolved sulphur and recovering the liquid mixture substantially free from molecular sulphur but relatively high in combined sulphur.

In testimony whereof I have hereunto subscribed my name at Chicago, Cook county, Illinois.

ERIC T. HESSLE.